United States Patent [19]
Dove

[11] 3,823,978
[45] July 16, 1974

[54] VEHICLE SEAT HARNESSES OR SAFETY BELTS

[75] Inventor: Ernest Baker Dove, Leigh-On-Sea, England

[73] Assignee: Teleflex Limited, Essex, England

[22] Filed: Feb. 8, 1973

[21] Appl. No.: 274,013

[30] Foreign Application Priority Data
July 23, 1971  Great Britain................... 34792/71

[52] U.S. Cl.............. 297/388, 280/150 SB, 297/385
[51] Int. Cl........................ B60r 21/10, A60b 35/00
[58] Field of Search.................. 297/385, 386, 388; 280/150 SB

[56] References Cited
UNITED STATES PATENTS

| | | | |
|---|---|---|---|
| 3,287,062 | 11/1966 | Board et al. | 297/388 |
| 3,287,063 | 11/1966 | Nicholas | 297/388 |
| 3,318,634 | 5/1967 | Nicholas | 297/388 |
| 3,462,192 | 8/1969 | Fredericks | 297/388 X |
| 3,547,490 | 12/1970 | Stoffel | 297/388 |

*Primary Examiner*—Casmir A. Nunberg

[57] ABSTRACT

A seat harness or safety belt comprising a first assembly adapted to be mounted at one side of a seat and including a first part of a two-part fastening buckle. A second assembly adapted to be mounted at the other side of the seat and including a spring-loaded webbing retracting reel which supplies a variable length of webbing having at its free end the other part of said fastening buckle. Manually releasable snubbing device which normally engages the webbing leaving the reel to restrain the webbing from movement into and out of said reel, said second assembly further includes a flexible stalk through which said webbing passes. The reel and the snubbing device being located at respective opposite ends of said stalk, said first assembly further includes a flexible stalk at one end of which is attached said first part of the fastening buckle.

7 Claims, 4 Drawing Figures

PATENTED JUL 16 1974
3,823,978
SHEET 1 OF 2

VEHICLE SEAT HARNESSES OR SAFETY BELTS

This invention relates to seat harnesses or safety belts.

According to the present invention, a seat harness or safety belt comprises a first assembly adapted to be mounted at one side of a seat and including a first part of a two-part fastening buckle, and a second assembly adapted to be mounted at the other side of the seat and including a spring-loaded webbing retracting reel which supplies a variable length of webbing having at its free end the other part of said fastening buckle, and a manually releasable snubbing device which normally engages the webbing leaving the reel to restrain the webbing from movement into and out of said reel.

In order that the invention may be well understood, an embodiment thereof, given by way of example only, will now be described reference being had to the accompanying drawings, in which.

Figure 1:
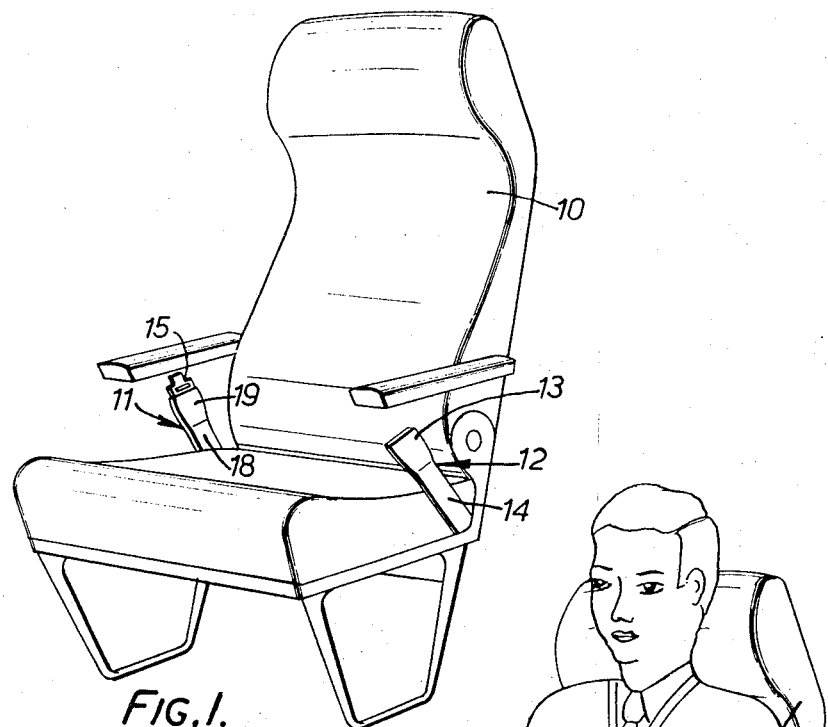
FIG. 1 shows a harness embodying the invention fitted to a seat.
Figure 2:
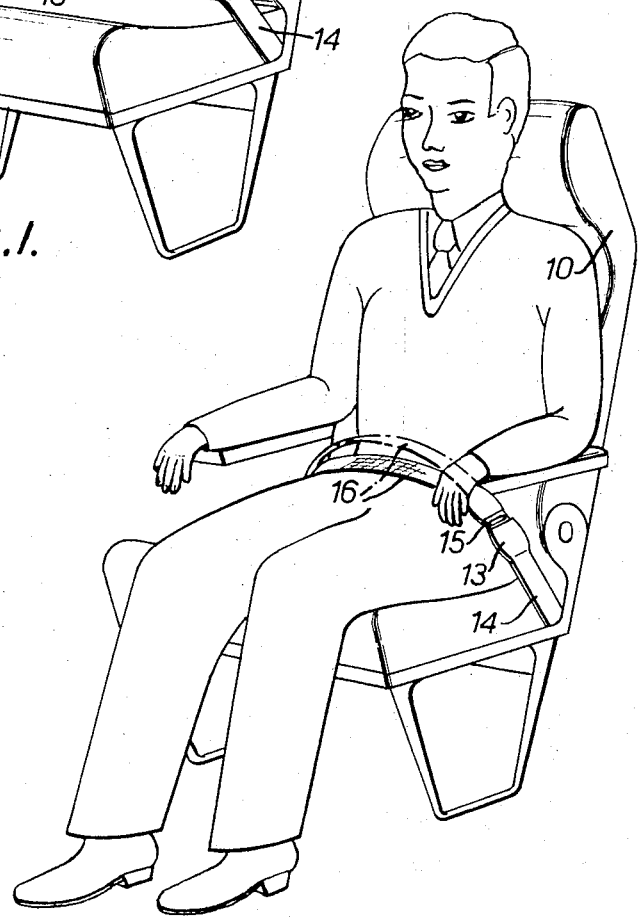
FIG. 2 shows the same harness in use.

Referring to FIGS. 1 and 2, a safety harness or seat belt of the lap type for an aircraft passenger seat 10 comprises two flexible assemblies 11 and 12 mounted respectively at opposite sides of the seat 10 by means of a mounting on the seat that can, if desired, be of a quickly detachable type to enable rapid replacement of harnesses in the event of unserviceability or contamination. The assembly 11 is a webbing storage and adjuster assembly which is provided with webbing 16 having a buckle tongue 15, and the assembly 12 comprises a buckle 13 on the end of a flexible stalk 14 for receiving the buckle tongue 15 on the webbing 16 drawn from the assembly 11.

Figure 3:
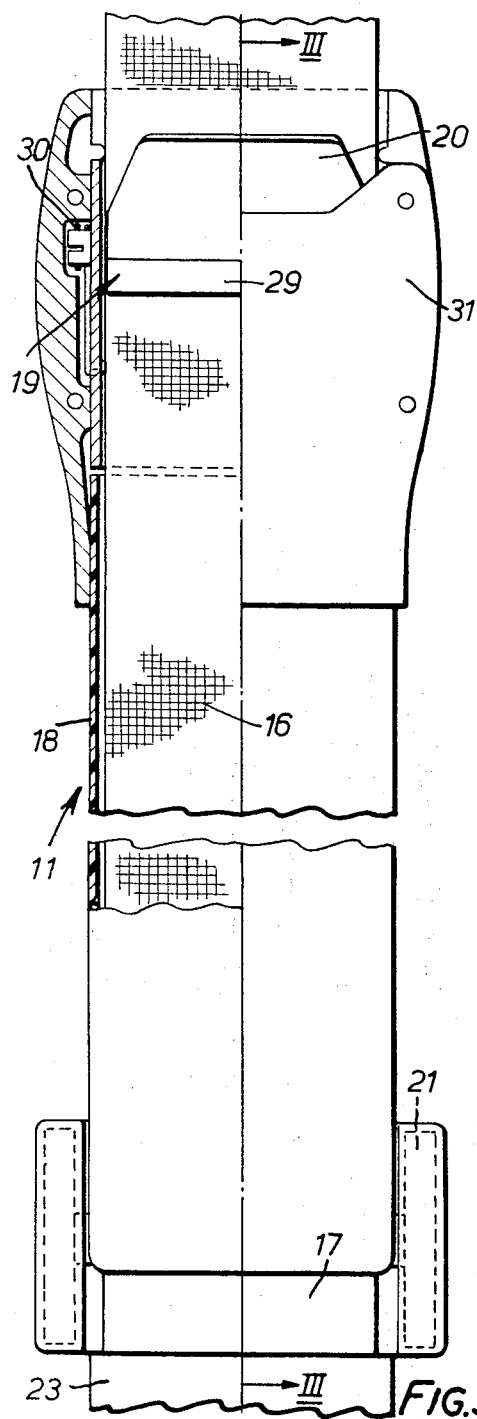
FIG. 3 shows, partially in section, a webbing storage and adjuster assembly of the harness.
Figure 4:
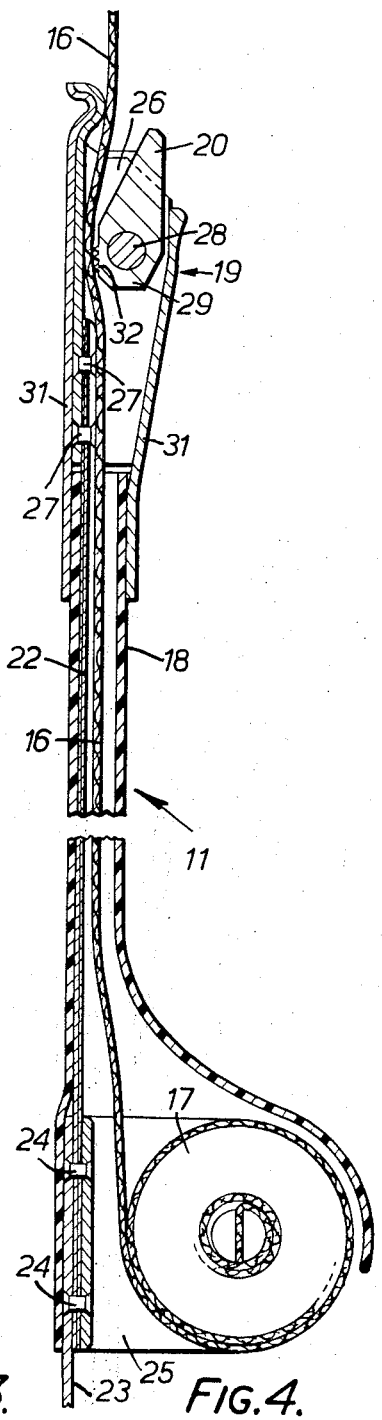
FIG. 4 is a view along the line III—III of FIG. 4.

As can be seen from FIGS. 3 and 4 which show the webbing storage and adjuster assembly 11 in more detail, the webbing 16 is led from a spring-loaded retraction reel 17 through a cover sleeve 18 of plastics material that extends upward from the reel mounting to form a flexible stalk, as a counterpart to the stalk 14 on the opposite side of the seat bearing the buckle 13. At the top of the stalk 18 is an adjuster 19 which incorporates a snubbing device having a snubber 29 acting on the webbing passing through it. FIG. 4 shows the snubbing device in its webbing-snubbing position in which position the snubbing device restrains the webbing 16 from movement into the reel 17 under the influence of rewind springs 21 in the reel and out of the reel 17 in the event of an increasing load applied to the webbing 16 in the withdrawal direction. The snubber 29 is releaseable by a finger-operated release trigger 20 to allow movement of the webbing through the adjuster 19.

The seat occupant withdraws a suitable length of webbing 16 from the storage assembly 11 by pulling on the buckle tongue 15 at the free end of the webbing and at the same time releasing the adjuster by pressing the release trigger 20. To fasten the harness he introduces the tongue 15 into the buckle 13 until a mechanical metal-to-metal click tells him that it has engaged. Excess webbing withdrawn by the seat occupant to facilitate buckle engagement is taken up when the release trigger 20 is pressed to allow the webbing to rewind automatically under the influence of the rewind springs 21. When the trigger 20 is let go the snubbing device returns to its webbing snubbing position and the harness is secure and locked to effect occupant restraint in the event of vehicle deceleration. To put the harness into a relaxed or slack position, the seat occupant again presses the trigger 20 and at the same time pulls on the webbing at the centre of his lap until a strap length is reached that he decides is comfortable. Letting go of the trigger at this length will maintain the belt slack, the snubber 29 preventing the webbing 16 from being rewound onto the reel 17 by the rewind springs 21. In the event of a pilot demand for refitting harnesses all the seat occupant is required to do is to press the trigger 20 and the rewind springs 21 will automatically return the harness to the restraint position. If the occupant should wish to leave his seat whilst the harness is in the slack position, he lifts a release cover of the buckle 13 which unfastens the belt and frees him from the seat. Upon his return he merely re-engages the tongue 15 with the buckle 13 to find himself with the harness refitted in the same slack position.

The assembly 11 is resiliently flexible in its construction by virtue of a laminated spring steel tension member 22 which extends through the cover sleeve or stalk 18 and permits bending around the hip part of the wearer's body when the harness is fitted. The buckle stalk 14 on the other side of the seat is similarly constructed. At the lower end an attachment plate 23 is secured to the seat frame by suitable permanent or detachable means (not shown). To this plate via rivets 24 the laminated tension member 22 is secured, as is also a non-load-carrying frame 25 of the webbing storage reel 17. A frame 26 of the adjuster 19 is similarly attached to the laminated tension member 22 at the top end thereof by rivets 27. The frame 26 is of U shape with the snubber 29 hinged across the U by a pin 28, this pin being a tight fit in the snubber and free in the frame. Acting on this pin at each end is a torsion spring 30 that urges the snubber 29 into the webbing-snubbing position. A plastics cover 31 over the adjuster 19, and the sleeve 18, provide a styling feature and operating tunnel for the free movement of the webbing 16.

With the snubber 29 in its normal or webbing-snubbing position the webbing 16 is in a jammed state between the back face of the frame 26 and jam teeth 32 on the snubber. An increasing load applied to the webbing 16 in the withdrawal direction tends to rock the snubber 29 farther in the jamming direction thereby giving the seat occupant a secure harness. By pressing the trigger 20, which is integral with the snubber 29, the jam teeth 32 are pivoted away from the webbing thereby increasing the clearance from the frame back to permit free movement of the webbing through the adjuster in the withdrawal or rewinding sense.

The current preference of airlines is for safety harnesses to be worn by passengers throughout a flight. It will be appreciated that the described harness is particularly suitable for such use as the harness can be worn by the passenger in the restraint mode when so instructed by the aircrew, and can be relaxed easily at other times to a position of comfort allowing considerable freedom of movement without actually needing to be unfastened.

The described harness is not restricted to use in aircraft but can be employed in other situations, such as in automobiles, or invalid chairs and so forth.

What we claim is:

1. A seat harness or safety belt comprising a first assembly adapted to be mounted at one side of a seat and including a first part of a two-part fastening buckle, and a second assembly adapted to be mounted at the other side of the seat and including a spring-loaded webbing retracting reel which supplies a variable length of webbing having at its free end the other part of said fastening buckle, and a manually releasable snubbing device which normally engages the webbing leaving the reel to restrain the webbing from movement into and out of said reel, said second assembly further includes a flexible stalk through which said webbing passes, the reel and the snubbing device being located at respective opposite ends of said stalk, said first assembly further includes a flexible stalk at one end of which is attached said first part of the fastening buckle.

2. A seat harness or safety belt as claimed in claim 1, in which the or each flexible stalk comprises a sleeve of plastics material.

3. A seat harness or safety belt as claimed in any of claims 1, in which the or each flexible stalk incorporates a resiliently flexible tension element.

4. A seat harness or safety belt as claimed in claim 3, in which said tension element is a laminated metal tension element.

5. A seat harness or safety belt as claimed in claim 1, in which said snubbing device comprises a pivotal snubber member which is biased such that teeth provided thereon normally engage the webbing.

6. A seat harness or safety belt as claimed in claim 5, in which said snubber member is biased by a torsion spring.

7. A seat harness or safety belt as claimed in claim 5, in which said snubber member is provided with an integral release trigger operation of which causes the teeth of the snubber member to disengage the webbing.

* * * * *